United States Patent
Chu et al.

(10) Patent No.: US 8,379,517 B2
(45) Date of Patent: Feb. 19, 2013

(54) CALL ADMISSION AND PREEMPTION FOR MULTIPLE BIT-RATE APPLICATIONS

(75) Inventors: Thomas P. Chu, Englishtown, NJ (US); Tewfik Doumi, Edison, NJ (US); Dong Sun, New Providence, NJ (US)

(73) Assignee: Alcatel Lucent, Paris (FR)

( * ) Notice: Subject to any disclaimer, the term of this patent is extended or adjusted under 35 U.S.C. 154(b) by 319 days.

(21) Appl. No.: 12/814,864

(22) Filed: Jun. 14, 2010

(65) Prior Publication Data

US 2011/0305240 A1    Dec. 15, 2011

(51) Int. Cl.
*G01R 31/08* (2006.01)
(52) U.S. Cl. .................................. 370/229; 370/330
(58) Field of Classification Search .................. None
See application file for complete search history.

(56) References Cited

U.S. PATENT DOCUMENTS

| | | |
|---|---|---|
| 2003/0202475 A1 | 10/2003 | Chen et al. |
| 2004/0165528 A1 | 8/2004 | Li et al. |
| 2008/0175263 A1 | 7/2008 | Chen et al. |
| 2008/0192632 A1 | 8/2008 | Bader |
| 2011/0305137 A1* | 12/2011 | Chu et al. ............. 370/230 |
| 2011/0305240 A1* | 12/2011 | Chu et al. ............. 370/391 |

OTHER PUBLICATIONS

"Digital cellular telecommunications system (Phase 2+);Universial Mobile Telecommunications System (UMTS); LTE; Quality of Service (QoS) concept and architecture (3GPP TS 23.107 version 9.0.0 Release 9)", Technical Specification, European Telecommunications Standards Institute (ETSI), 650, Route Des Lucioles; F-06921 Sophia-Antipolis; France, No. V9.0., Jan. 1, 2010.
International Search Report for PCT/US2011/039210 dated Aug. 4, 2011.

* cited by examiner

*Primary Examiner* — Robert Wilson
(74) *Attorney, Agent, or Firm* — Kramer & Amado P.C.

(57) ABSTRACT

Embodiments of the present invention are directed to providing a method and system for call admission control and preemption of multiple bit-rate applications in a digital communication system. Multiple bit-rate applications such as streaming video can specify a Quality of Service (QoS) profile having multiple levels. When there are insufficient resources in the network to support an incoming multiple bit-rate call, the system determines whether, by reducing the bit-rate of the incoming call or by preemption of lower priority components of existing calls, enough resources can be recovered to support the incoming call.

11 Claims, 2 Drawing Sheets

CALL ADMISSION AND PREEMPTION FOR MULTIPLE BIT-RATE APPLICATIONS

CROSS REFERENCE TO RELATED APPLICATIONS

The present application is related to copending U.S. patent application entitled "ADMISSION CONTROL FOR SHARED LTE NETWORK" (Chu et al.), filed concurrently herewith as application Ser. No. 12/814,834, the entire content of which is incorporated herein by reference.

FIELD OF THE INVENTION

The invention is directed to packet switching communication networks, and particularly to call admission control and preemption for multiple bit-rate applications.

BACKGROUND OF THE INVENTION

Call Signaling

In many packet switching applications, a user may require some minimal quality of service (QoS) from the network so that it can work properly. In general, an application will request the network to provide the required QoS by encoding the QoS parameters in the call signaling messages.

For example, consider Long Term Evolution (LTE) from 3rd Generation Partnership Project (GPP), which is the next generation technology and architecture for 3GPP.

In LTE, user equipment (UE) will send and receive user packets through its designated PDN-GW (Public data network-gateway). The PDN-GW will forward the data packet from the UE to its intended destination. It also accepts packets on the behalf of the UE, and then forwards the arriving packets to the UE. (Note that there are other network elements such as the eNodeB and the S-GW between an UE and the PDN-GW)

The logical connection between the UE and the PDN-GW is referred to as the EPS (Evolved Packet System) "bearer" (or bearer for short). Associated with each bearer is a QoS (Quality of Service) profile which governs how packets of this bearer should be treated by the network. As a UE may have multiple concurrent sessions, each with a different QoS needs, multiple bearers can be set up between an UE and the PDN-GW, each supporting a different QoS. Multiple sessions of the same QoS class can be mapped onto the same bearer.

When a UE wants to set up an EPS bearer to the PDN-GW, it will send a Bearer Resource Modification request message to the PDN-GW. The message includes the following information (with other information):

Service data flow templates which are used by the gateways to detect packets that belongs to a data flow, upstream and downstream.

QCI-QoS class identifier which defines the level of service required (such as the packet loss rate and delay)

Upstream (UL) and downstream (DL) maximum bit rate (MBR)

Upstream and downstream guaranteed bit rate (GBR)

Allocation and Retention Priority (ARP) parameter, which specifies the priority of the call for call admission and, when in congestion, whether it can preempt a lower priority call or be preempted by higher priority call.

The QCI, MBR, GBR, ARP are collectively referred to as the QoS parameters of the bearer.

There are other call signal protocols that provides QoS request. A well known example is the Session Initiation Protocol (SIP) from the Internet Engineering Task Force (IETF).

Call Admission and Call Preemption

When a user requests a specific QoS level for a call from the network, the network may not have enough resources to support the call and maintain the QoS level as requested. In these instances, the network would not admit the call and the call is blocked. However, the incoming call may be of high priority and network operator may want to admit the incoming high priority call at the expense of the lower priority established calls. In these instances, preemption would take place. Lower priority call(s) would be disconnected to free up enough resources so the higher priority call would be admitted. The selection of which calls to be preempted depends on the policy of network operator, as well as the capabilities of the equipment.

Multiple Bit-Rate Applications

Many applications can operate at multiple bit-rate levels. Consider streaming video as an example. The nominal speed for a particular video encoder may be 10 Mbps. An application may be willing to transmit at ¼ the nominal speed by reducing the screen size (½ the height and ½ the width). Therefore, the speed now is 2.5 Mps. By accepting B&W and forgoing color, a reduction of another 50% could be achieved. Reducing the frame rate of a streaming video application can be another method of reducing the bandwidth required, as would using a different compression algorithm or controlling parameters of a compression algorithm.

In view of the foregoing it would be desirable to provide an improved system and method for call admission and preemption to take advantage of flexibility of multiple bit-rate applications.

SUMMARY OF THE INVENTION

For multiple bit-rate applications, it may not be efficient to preempt an entire call to free up resources to order to allow a higher priority call. Depending on the resources required by the incoming call, it may be sufficient for these calls to operate at lower data rates to free up enough resources. Therefore, embodiments of the present invention provide a method that allows these calls to drop back speed during preemption to free up bandwidth instead of being disconnected completely.

Embodiments of the present invention are directed to a method of providing call admission control of multiple bit-rate applications in a digital communication system. The method comprising steps of: identifying allowable bit rates levels and associated priority levels of an incoming multiple bit-rate call; determining if the incoming multiple bit-rate call can be admitted, at a first, maximum requested bit-rate level and associated minimum priority level; and if the incoming multiple bit-rate call can not be admitted, selecting a lower allowable bit-rate level and associated priority level for the incoming call, and repeating the determining step until the incoming multiple bit-rate call can be admitted; admitting the multiple bit-rate call at the last-selected lower allowable bit-rate level and associated priority level.

In some embodiments, the lower of the allowable bit-rate levels are associated with a corresponding higher priority level.

In some embodiments, the admitting step further comprises sending a signaling message to a User Equipment (UE) initiating the incoming call, indicating the last-selected lower allowable bit-rate.

In some embodiments, the step of identifying allowable bit-rate levels and associated priority levels of an incoming multiple bit-rate call further comprises identifying individual call components which comprise the allowable bit-rate levels, wherein each individual call component has an associated priority level.

In some embodiments, the determining step further comprises a step of preempting components of existing multiple bit-rate calls having a lower priority than the priority level of the incoming call.

In some embodiments, the step of preempting components comprises making the call components inactive.

In some embodiments, if a call is dropped by the communication system, the method further comprises steps of: Determining available bandwidth of the communication system; compiling a candidate list of current inactive call components of active multiple bit-rate calls along with their associated bit-rate and priority level; sorting the candidate list by priority level, higher priority level first; selecting from the candidate list, in order, inactive call components whose bit-rate can be accommodated by the available bandwidth of the communication system; activating the selected inactive call components in order to upgrade the service of the active calls associated with the selected inactive call components.

In some embodiments, the digital communications system comprises a packet data network.

In some embodiments, the digital communications system comprises a Long Term Evolution (LTE) packet data network.

In some embodiments, the process occurs at an eNodeB of an LTE network.

BRIEF DESCRIPTION OF THE DRAWINGS

Some embodiments of apparatus and/or methods in accordance with embodiments of the present invention are now described, by way of example only, and with reference to the accompanying drawings in which.

In the figures like features are denoted by like reference characters.

DETAILED DESCRIPTION

Figure 1:
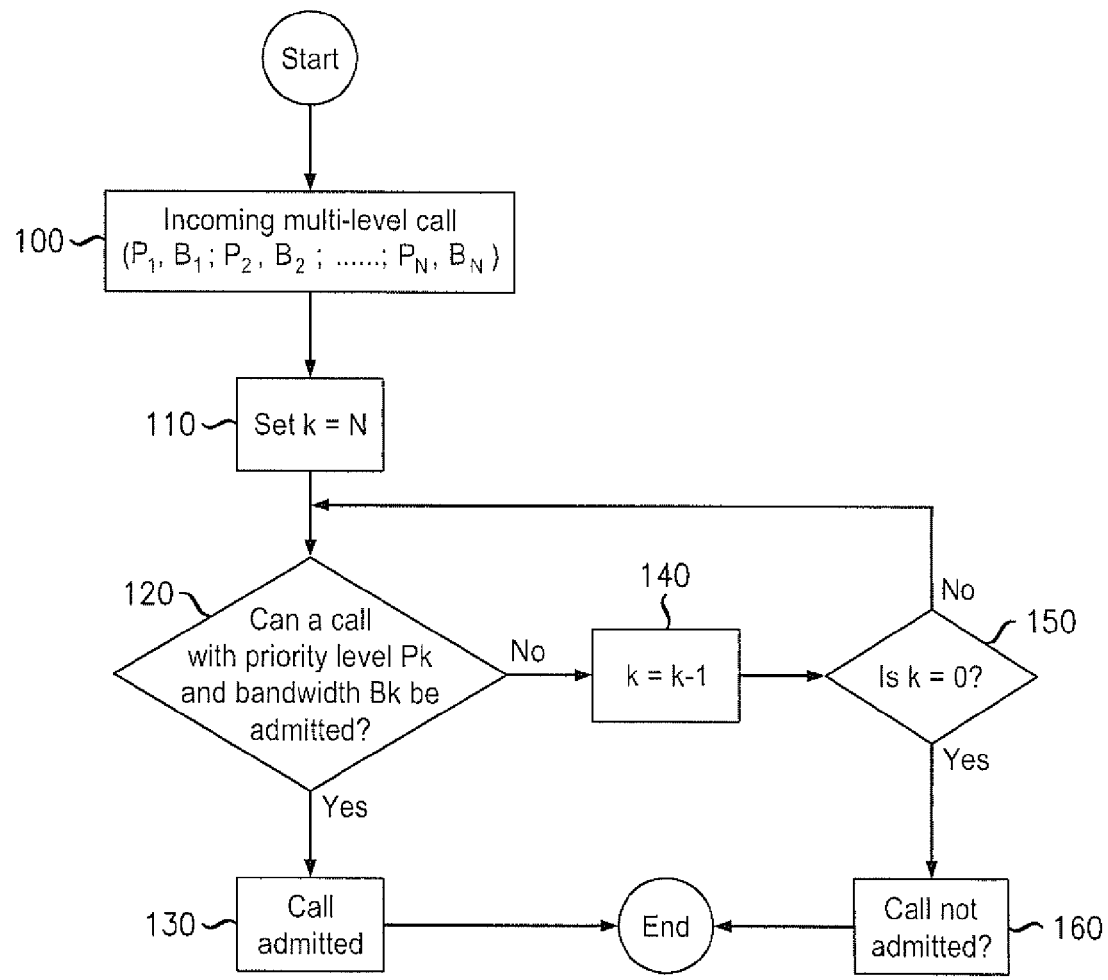
FIG. 1 illustrates a flow chart for an embodiment of a call admission and preemption process for a multiple bit-rate call.

There are many applications that can operate at different bandwidth levels, which are referred to as multiple bit-rate applications, and associated calls as multiple bit-rate calls. These applications and calls are sometimes referred to as multi-rate; or variable bit-rate applications and calls, and for the purposes of this document these term scan be considered interchangeable. When a new calls arrives at a network, and there are insufficient resources to support the call, preemption could be used to free up network resources to admit the incoming call. However, in many circumstances, it would be inefficient, by default, to disconnect a multiple bit-rate call completely to support a higher priority call. In many situations, it may sufficient to request a multiple bit-rate call to operate at lower level. By operating at a lower rate, it may be possible that sufficient resources are released to support the incoming call.

It is impractical, when a new call arrives and preemption is needed, for the eNodeB to request from the UEs whether the application is a multiple bit-rate application. Therefore, embodiments of this invention specify that the following information, encoded as new information elements (IE), be added to the bearer set up messages (e.g., IP-CAN Session Modification, Bearer Set-up Request, and Request Bearer Resource Modification in LTE):

An indication that the application would support multiple QoS levels.

The different QoS levels that this application is willing to support.

For each QoS level, the priority level of the QoS level.

Consider the stream video described previously as an example. The UE, UE A, may encode the QoS levels as follows:

10 Mps, priority 3, drop back OK
5 Mbps, priority 2, drop back OK
1.25 Mps, priority, no drop-back, non-preemptable In LTE, the bearer set up signaling message contains the following parameters:

Service data flow templates which are used by the gateways to detect packets that belongs to a data flow, upstream and downstream. These templates are referred to as the TFT (traffic flow template).

QCI—QoS class identifier

Upstream (UL) and downstream (DL) maximum bit rate (MBR)

Upstream and downstream guaranteed bit rate (GBR)

The allocation and retention priority (ARP) parameter,

It is possible that the MBR and GBR (uplink or downlink) for a bearer to have different values. In many LTE implementations, the eNodeB would map the pair of values to a single value which is often referred to as the effective bandwidth (uplink or downlink respectively) of the call. To simplify description, in the subsequent paragraphs, the term bandwidth is used to mean the effective bandwidth of the call (or the value pair). Usually, effective bandwidth is expressed in bits per second, the same as regular bandwidth.

In many applications, the bandwidth required the uplink and downlink directions are different. Also, the physical bandwidth of uplink and the downlink is different. The downlink has higher capacity than the uplink. Therefore, the logic for admission control and preemption are handled separately for the uplink and the downlink. However, the processing logic is the same for both directions. In the subsequent description, the invention is described for a single direction. In actual implementation, two identical processes will be implemented in the eNodeB to managing call admission and preemption for uplink and downlink respectively.

The following notation will be used to describe a multiple bit-rate call with N levels:

($P_1$, $B_1$; $P_2$, $B_2$; ... $P_N$, $B_N$), where $P_i$ is the priority level of level i, with $P_1$ being the highest priority;

$B_i$ is the bandwidth required for the $i^{th}$ level, with $B_1 < B_2$; ... $< B_N$.

A normal call can be considered logically as a multiple bit-rate call with one level.

Call Admission for Multiple Bit-Rate Call

FIG. 1 is an illustration of an embodiment of a call admission process for a multiple bit-rate call. At step 100, a multiple bit-rate call arrives with N levels ($P_1$, $B_1$; $P_2$, $B_2$; ... $P_N$, $B_N$). At step 110, the process sets k=N. At step 120, the process determines whether a call with priority $P_k$ and with bandwidth $B_k$ can be admitted. If so, the process proceeds to step 130, where the incoming call is admitted at level k. A signaling message is sent to the UE indicating the call is admitted at level k. Note that it is possible that, by admitting this call, other calls (regular calls as well as other multiple bit-rate calls) may be preempted. Preemption for multiple bit-rate calls may mean that the call operates at a lower bit rate. After step 130, the process ends.

If at step 120, the process determines that the call, at the current selected level, can not be admitted, the process proceeds to step 140, where the process sets k=k−1. Step 150 checks whether k=0. If k>0, the process goes back to step 120 to process the next level of the incoming multiple bit-rate call. If at step 150, the process determines that k=0, this means that the algorithm has processed all the levels of the incoming multiple bit-rate call without success, and the process proceeds to step 160, where the call is not admitted. A signaling message is sent back to the UE to indicate the call is not admitted.

Once a multiple bit-rate call with N levels is admitted, it is considered to have N components:

Component 1 ($C_1$) has priority P1 and bandwidth $D_1=B_1$,
Component 2 ($C_2$) has priority 1 and bandwidth $D_2=B_2−B_1$,
...,
Component N (CN) has priority 1 and bandwidth $D_N=B_N−B_{n-1}$.

If the call is admitted at level k, then components $C_1$ to $C_k$ are active, with a total bandwidth of $B_k$ which is the total of the incremental bandwidths of each active component ($B_k=D_k+D_{k-1}++D_1$). Components $C_{k+1}$ to CN will be inactive.

Preemption of Multiple Bit-Rate Call

When a new call arrives, preemption may be necessary. In the preemption process, each component of a multiple bit-rate call is treated as a separate call. Thus, if a multiple bit-rate call has three active components C1, C, and C3, they are treated as three separate calls. Since C1 has higher priority than C2 and C3, C1 can not be preempted unless C2 and C3, having lower priority, are also preempted. At the end of the preemption process, some or all of the active components of a multiple bit-rate call may be preempted. If some of the components are preempted to level k, the preempted components will be $C_k$, $C_{k+1}$, ..., Cn. In this case, the eNodeB sends a mid-call signaling message to the UE indicating that multiple bit-rate call should operate at level (k−1), i.e., at priority Pk-1 and bandwidth Ck-1. Components Ck, Ck+1, Cn will become inactive. If all the active components of a multiple bit-rate call are preempted, the call will be dropped.

EXAMPLE

The following example illustrates an embodiment of a call admission process of multiple bit-rate calls. Multiple bit-rate call 1 has 4 levels with the following characteristics: (P1, 2 Mbps; P2, 4 Mbps; P3, 6 Mbps; P4, 8 Mbps). Assume the capacity of the link is 10 Mbps. Assume that the system has no other calls when call 1 arrives. Call 1 is then admitted at level 4 because at level 4, the call requires 8 Mbps and the system has 10 Mbps. After admission, call 1 has 4 components (C1, C2, C3, C4), each having 2 Mbps of bandwidth.

Assume that a second multiple bit-rate call, call 2, arrives, with identical characteristics as call 1. The admission control process at eNodeB would be as follows:

First, the call admission process evaluates call 2 at level 4, the lowest level of call 2. At level 4, call 2 requires 8 Mbps, but the system currently only has 2 Mbps not in use. Therefore, the call can not be admitted without preemption. However, Call 2 being of priority P4 can not preempt any of the components of call 1. Therefore, call 2 can not be admitted at level 4.

Then, the eNodeB would determine whether call 2 can be admitted at level 3. The required bandwidth is 6 Mbps. The available bandwidth is 2 Mbps. Therefore, the call can not be admitted without preemption. Call 2, at level 3, can preempt component 4 of call 1 which has a lower priority than call 2 at level 3. However, this would only free up 2 Mbps, resulting in 4 Mbps of available bandwidth, which would not sufficient. Therefore, call 2 can not be admitted at level 3.

Next, eNodeB will determine whether call 2 can be admitted at level 2. At level 2, call 2 requires 4 Mbps. Preemption would be necessary to admit this call. Call 2 at level 2 can preempt component 3 and component 4 of call 1, thus freeing up 4 Mbps of bandwidth (resulting in 6 Mbps of available bandwidth). However, since only 4 Mbps is needed, the system will only preempt component 4 of call 1. Therefore, call 2 can be admitted at level 2 by preempting components 4 of call 1.

The eNodeB will send signaling messages to the UEs of call 2 indicating that the call is admitted at level 2 (components 1 and 2 active, components 3 and 4 inactive). It also will send mid-call signaling messages to UEs of call 1, indicating that the UEs should now operate at level 3 (components 1, 2 and 3 active, components 4 inactive). Note than the system will remember that both calls have 4 components at 2 Mbps each. Thus, in this example, after call 2 is admitted with the required preemption, call 1 will have the first 3 components active wile the last component is inactive. Call 2 will have the first two components active while the last two components are inactive.

Automatic Up-speed

As calls depart the network, network resources will be released. Under these circumstances, the system may want to upgrade the bandwidth of a multiple bit-rate call which is not operating at maximum requested bandwidth (i.e. some components of the call is inactive).

When a call departs the system, the eNodeB can automatically check whether some of the multiple bit-rate calls could be upgraded. An embodiment of such as procedure is illustrated by the flowchart in FIG. 2. At step 200, the process initializes the following parameters as follows:

V=current available bandwidth of the system

The selected list which represents current inactive multiple bit-rate call components that could be upgraded (i.e. make active). This list is initialized as an empty list.

The candidate list: This is the list of currently inactive components of multiple bit-rate calls arrange in the following order:

Components with higher priority are placed before components with lower priority.

Among components with the same priority, the order is arranged according to the time of call arrival; the ones that arrive first are placed before those which arrive latter.

At step 210, the process checks if the candidate list is empty. If the candidate list is not empty, the process continues to step 220 where it determines the bandwidth requirements (F) of the first member of the candidate list. At step 230 the process checks if F is less than or equal to V, the current available bandwidth. If so, this means that the first member can be upgraded (i.e. make active), and the process continues to step 240 where the first member is added to the selected list and removed from the candidate list. At step 250, V is updated to V−F, and process goes back to step 210 to evaluate the next member.

If at step 230, it is determined that F>V, this means that the first member can not be upgraded, in which case the process proceeds to step 260 where the process removes this member and all other components in the candidate list that belongs to the same call, from the candidate list. The process then goes back to step 210 to evaluate the next member.

If at step 210 it is determined that the candidate list is empty, the process continues to step 270, where the process checks whether the selected list is empty. If the selected list is empty, no upgrade is possible and the algorithm terminates.

If at step 270 it is determined that the selected list is not empty, the process continues to step 280, where the process identifies components in the selected list that belong to the same call, and merges them together per call. At step 290, the process identifies the multiple bit-rate calls that can be upgraded and the appropriate level of upgrade. At step 300, the process then executes the upgrade by:

Sending signaling messages to the appropriate UE indicating to them that the bearer is upgrade to allow more bandwidth.

The status of the components that are upgraded is changed to active.

Update other pertinent parameters such current available bandwidth of the system.

The algorithm then terminates.

Figure 2:
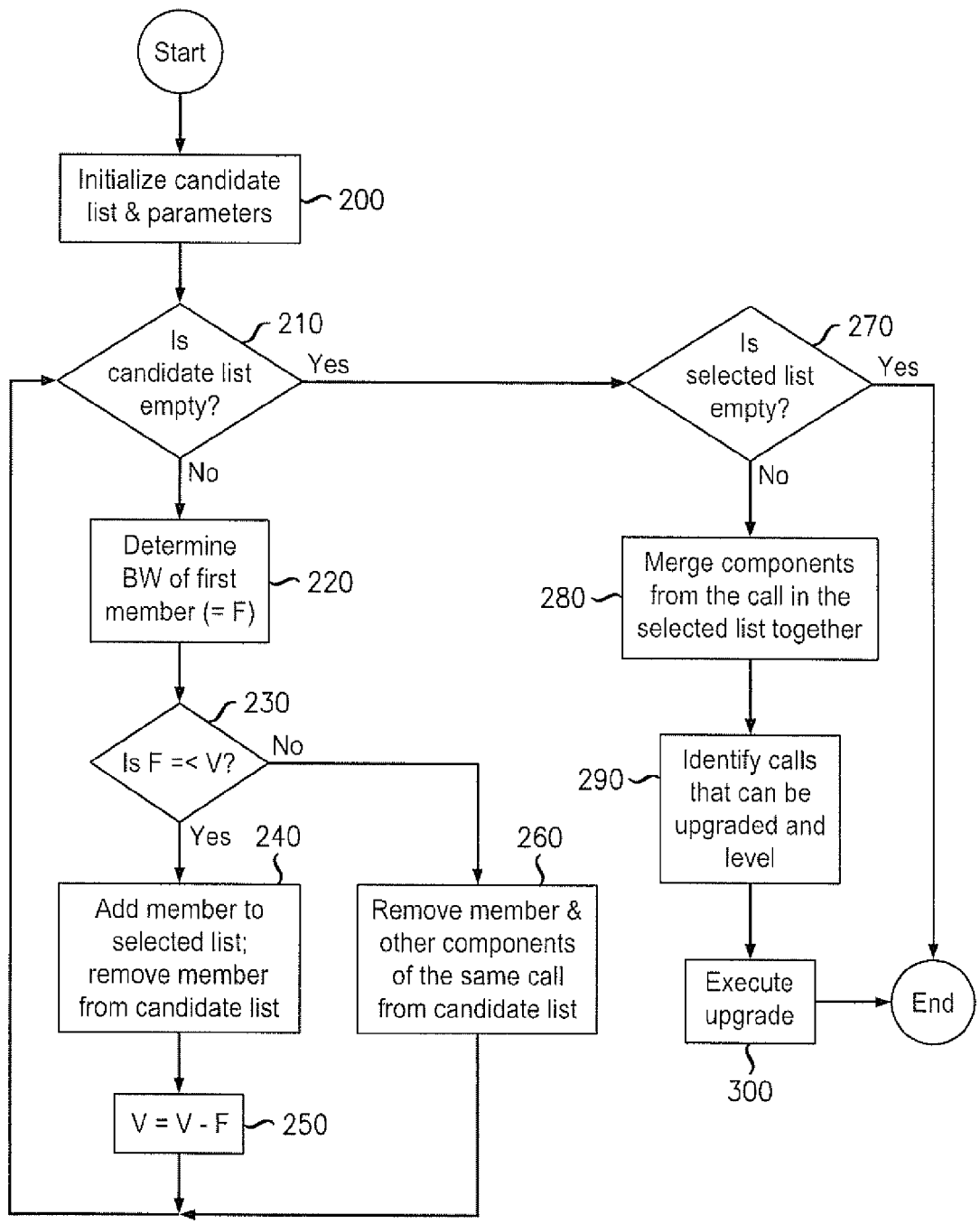
FIG. 2 illustrates a flow chart for an embodiment of a process to increase bit-rate for a multiple bit-rate call.

The process of FIG. 2 can be executed at any time, although right after a call departure is a natural and useful point of time as this is when network resources are released. However, for busy systems, calls may depart frequently. To avoid frequent execution of the above algorithm, in some embodiments, the eNodeB only executes the above algorithm after a predetermined time interval from the last execution of the process. An example of a predetermined time interval is 30 seconds.

In another embodiment, the eNodeB may maintain a parameter which represents the minimum bandwidth of all the inactive components. The above algorithm will only be executed if the current available bandwidth exceeds this minimum. This would reduce the amount of processing needed to support automatic upgrade.

Variations

In this document, LTE is used as the context to describe embodiments of the invention. However, it should be apparent to persons skilled in the art that the invention is applicable to all digital communications systems that support call admission and preemption based on network resource availability.

The scope of the present invention encompasses many other embodiments. For example, the call components with the same priority in the candidate list may be arranged differently (e.g., component with the least bandwidth is placed first, instead of components with an earlier of time of arrival). It is appreciated that these variations although not explicitly described or shown herein, embody the principles of the invention, and are included within its spirit and scope.

A person of skill in the art would readily recognize that steps of various above-described methods can be performed by programmed computers. Herein, some embodiments are also intended to cover program storage devices, e.g., digital data storage media, which are machine or computer-readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the figures, including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Numerous modifications, variations and adaptations may be made to the embodiment of the invention described above without departing from the scope of the invention, which is defined in the claims.

What is claimed is:

1. A method of providing call admission control of multiple bit-rate applications, the method comprising:

identifying, in a digital communication system, allowable bit-rate levels and associated priority levels of an incoming multiple bit-rate call;

determining if said incoming multiple bit-rate call can be admitted to the digital communication system, at a first, maximum requested bit-rate level and associated minimum priority level;

when said incoming multiple bit-rate call cannot be admitted at the first, maximum requested bit-rate level and associated minimum priority level, selecting a lower allowable bit-rate level and associated higher priority level for said incoming multiple bit-rate call;

repeating both said determining step, with the selected lower allowable bit-rate level and associated higher priority level in each iteration, and the selecting step, until said incoming multiple bit-rate call can be admitted; and admitting said multiple bit-rate call at a last-selected lower allowable bit-rate level and associated higher priority level.

2. The method of claim 1, wherein lower allowable bit-rate levels are respectively associated with corresponding higher priority levels.

3. The method of claim 1, wherein said admitting step further comprises:
sending a signaling message to a User Equipment (UE) initiating said incoming multiple bit-rate call; and
indicating said last-selected lower allowable bit-rate.

4. The method of claim 2, wherein said identifying step further comprises:
identifying individual call components, wherein each individual call component comprises a particular bit-rate level and an associated priority level.

5. The method of claim 4, wherein said determining step further comprises:
preempting components of existing multiple bit-rate calls having a lower priority than a current priority level of said incoming call.

6. The method of claim 5 wherein said step of preempting components further comprises:
making said individual call components inactive.

7. The method of claim 6, wherein if a call is dropped by said digital communication system, the method further comprises:
determining available bandwidth of said digital communication system;
compiling a candidate list of current inactive call components of active multiple bit-rate calls along with their associated bit-rate and priority level;
sorting said candidate list by priority level, higher priority level first;
selecting from said candidate list, in order, inactive call components whose bit-rate can be accommodated by said available bandwidth of said digital communication system;
activating the selected inactive call components in order to upgrade the service of the active calls associated with said selected inactive call components.

8. The method of claim 1, wherein said digital communication system comprises a packet data network.

9. The method of claim 8, wherein said digital communication system comprises a Long Term Evolution (LTE) packet data network.

10. The method of claim 9, wherein said method occurs at an eNodeB of a Long Term Evolution (LTE) network.

11. A non-transitory storage medium encoded with instructions which when executed by a digital communication system perform the following:
identify allowable bit rate levels and associated priority levels of an incoming multiple bit-rate call;
determine if said incoming multiple bit-rate call can be admitted at a first maximum requested bit rate level and associated minimum priority level;
when said incoming multiple bit-rate call cannot be admitted at the first maximum requested bit-rate level and associated minimum priority level, select a lower bit-rate level and associated higher priority level for said incoming multiple bit-rate call;
repeat both said determining step with the selected lower allowable bit-rate level and associated higher priority level in each iteration, and the selecting step until said incoming multiple bit-rate call can be admitted; and
admit said multiple bit-rate call at a last-selected lower allowable bit-rate level and associated higher priority level.

* * * * *